United States Patent
Tsuji

(10) Patent No.: US 11,036,092 B2
(45) Date of Patent: Jun. 15, 2021

(54) LIGHT CONTROL UNIT AND WINDOW LIGHT CONTROL PLATE

(71) Applicant: TOPPAN PRINTING CO., LTD., Taito-ku (JP)

(72) Inventor: Masaki Tsuji, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 16/881,332

(22) Filed: May 22, 2020

(65) Prior Publication Data

US 2020/0285086 A1 Sep. 10, 2020

Related U.S. Application Data

(63) Continuation of application No. PCT/JP2018/042880, filed on Nov. 20, 2018.

(30) Foreign Application Priority Data

Nov. 27, 2017 (JP) .............................. JP2017-226921

(51) Int. Cl.
*G02F 1/1339* (2006.01)
*B60Q 1/00* (2006.01)
(Continued)

(52) U.S. Cl.
CPC .......... *G02F 1/1339* (2013.01); *B60Q 1/0029* (2013.01); *G02F 1/137* (2013.01); *G02F 1/13439* (2013.01)

(58) Field of Classification Search
None
See application file for complete search history.

(56) References Cited

U.S. PATENT DOCUMENTS

2005/0057703 A1* 3/2005 Tsubokura .......... G02F 1/13394
349/58
2007/0177092 A1* 8/2007 Hosoya ............. G02F 1/133305
349/149
(Continued)

FOREIGN PATENT DOCUMENTS

DE 10 2005 035 308 A1 2/2007
JP 2006-162823 A 6/2006
(Continued)

OTHER PUBLICATIONS

International Search Report dated Feb. 12, 2019 in PCT/JP2018/042880, filed Nov. 20, 2018 (with English Translation).
(Continued)

*Primary Examiner* — Ryan Crockett
(74) *Attorney, Agent, or Firm* — Oblon, McClelland, Maier & Neustadt, L.L.P.

(57) ABSTRACT

A light control unit including a light control sheet which includes a light control layer and is to be bonded to a surface of a transparent plate having an edge portion to be held in a window frame, and a buffer member including a portion that has a higher indentation hardness and a larger thickness than the light control sheet. The buffer member is to be positioned outside an edge of the light control sheet in the edge portion of the transparent plate on the surface such that the buffer member makes contact with the window frame when the edge portion of the transparent plate is held in the window frame.

20 Claims, 5 Drawing Sheets

(51) Int. Cl.
*G02F 1/1343* (2006.01)
*G02F 1/137* (2006.01)

(56) References Cited

U.S. PATENT DOCUMENTS

| | | | | |
|---|---|---|---|---|
| 2008/0136995 A1* | 6/2008 | Oohira | ............ | G02F 1/133308 349/58 |
| 2013/0016307 A1* | 1/2013 | Jeong | ............ | G02F 1/133615 349/61 |
| 2013/0141665 A1* | 6/2013 | Huang | ............ | G02F 1/133308 349/60 |
| 2015/0160484 A1* | 6/2015 | Liu | ............ | G02F 1/1339 349/153 |
| 2016/0082812 A1* | 3/2016 | Okuda | ............ | B32B 17/10761 49/323 |
| 2016/0363804 A1* | 12/2016 | Son | ............ | G02F 1/13336 |
| 2017/0235175 A1* | 8/2017 | Suzuka | ............ | G02F 1/133504 349/33 |
| 2018/0231834 A1* | 8/2018 | Chen | ............ | G02F 1/1339 |
| 2019/0041680 A1* | 2/2019 | Yoshida | ............ | G02F 1/13 |
| 2019/0121186 A1* | 4/2019 | Miura | ............ | G02F 1/13392 |
| 2019/0146249 A1* | 5/2019 | Wang | ............ | G02F 1/1333 349/84 |

FOREIGN PATENT DOCUMENTS

| | | |
|---|---|---|
| JP | 2007-102210 A * | 4/2007 |
| JP | 2017-102210 A | 6/2017 |
| WO | WO 2014/171470 A1 | 10/2014 |
| WO | WO 2016/063500 A1 | 4/2016 |
| WO | WO 2017/175796 A1 | 10/2017 |

OTHER PUBLICATIONS

Office Action dated Jun. 26, 2018 in Japanese Patent Application No. 2017-226921, filed Nov. 27, 2017, (with English Translation).
Extended European Search Report dated Dec. 8, 2020 in European Patent Application No. 18881213.5, 8 pages.

* cited by examiner

PRIOR ART

LIGHT CONTROL UNIT AND WINDOW LIGHT CONTROL PLATE

CROSS-REFERENCE TO RELATED APPLICATIONS

The present application is a continuation of International Application No. PCT/JP2018/042880, filed Nov. 20, 2018, which is based upon and claims the benefits of priority to Japanese Application No. 2017-226921, filed Nov. 27, 2017. The entire contents of all of the above applications are incorporated herein by reference.

BACKGROUND OF THE INVENTION

Field of the Invention

The present invention relates to a light control unit and a window light control plate including the light control unit.

Discussion of the Background

A light control device includes a light control sheet and a driving circuit. The light control sheet has a light transmittance that varies between when a driving voltage is applied and when no driving voltage is applied. The driving circuit generates a driving voltage applied to the light control sheet. FIG. 9 shows an example of a cross-sectional structure of the light control sheet. A light control sheet 100 includes a light control layer 110, a transparent conductive layer 120A and a transparent conductive layer 120B which are a pair of conductive layers, and a transparent substrate 130A and a transparent substrate 130B which are a pair of substrates. The light control layer 110 is sandwiched between the transparent conductive layer 120A and the transparent conductive layer 120B, and the light control layer 110 and the transparent conductive layers 120A and 120B are sandwiched between the transparent substrate 130A and the transparent substrate 130B. The light control layer 110 is composed of, for example, a liquid crystal such as a polymer network liquid crystal (PNLC) (see, for example, JP 2006-162823 A). Furthermore, the light control sheet 100 includes a sealing section 140 that is located between the transparent conductive layer 120A and the transparent conductive layer 120B at an edge of the light control sheet 100. The sealing section 140 has a function of preventing a liquid crystal composition contained in the light control layer 110 from leaking and preventing water or the like from seeping into the light control layer 110.

SUMMARY OF THE INVENTION

According to an aspect of the present invention, a light control unit includes a light control sheet which includes a light control layer and is to be bonded to a surface of a transparent plate having an edge portion to be held in a window frame, and a buffer member including a portion that has a higher indentation hardness and a larger thickness than the light control sheet. The buffer member is to be positioned outside an edge of the light control sheet in the edge portion of the transparent plate on the surface such that the buffer member makes contact with the window frame when the edge portion of the transparent plate is held in the window frame.

According to another aspect of the present invention, a window light control plate includes a transparent plate having an edge portion to be held in a window frame, a light control sheet bonded to a surface of the transparent plate and including a light control layer, and a buffer member which has a portion having a higher indentation hardness and a larger thickness than the light control sheet. The buffer member is positioned outside an edge of the light control sheet in the edge portion of the transparent plate on the surface such that the buffer member makes contact with the window frame when the edge portion of the transparent plate is held in the window frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
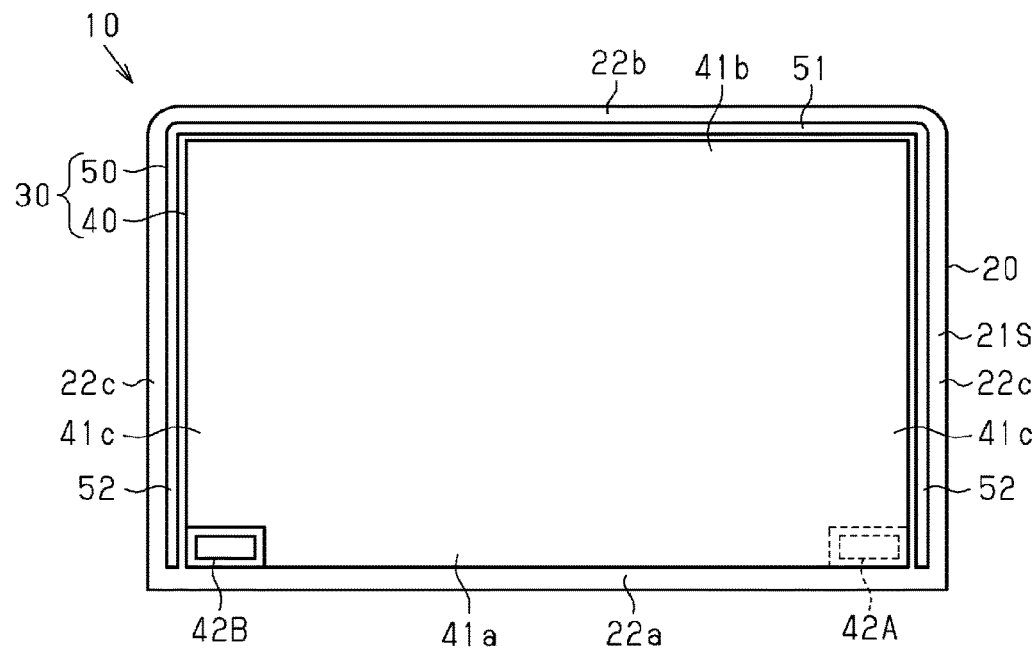
FIG. 1 shows a planar structure of a window light control plate including a light control unit of an embodiment.

The embodiments will now be described with reference to the accompanying drawings, wherein like reference numerals designate corresponding or identical elements throughout the various drawings.

An embodiment of a light control unit and a window light control plate will be described with reference to FIGS. 1 to 7.

<Basic Structure>

A basic structure of the light control unit and the window light control plate will be described with reference to FIGS. 1 to 4.

As shown in FIG. 1, a window light control plate 10 includes a transparent plate 20 that functions as a window plate, and a light control unit 30 that is attached to the transparent plate 20. The light control unit 30 includes a light control sheet 40 and a buffer member 50.

The window light control plate 10 of the present embodiment is used as a component of a movable window device mounted to automobiles. Specifically, the window light control plate 10 is assembled to a door member of the vehicle. In the following description, an up direction is defined as a direction in which the window light control plate 10 is moved when a window including the window light control plate 10 is closed, and a down direction is defined as a direction in which the window light control plate 10 is moved when the window including the window light control plate 10 is opened.

The transparent plate 20 is a plate-shaped member, and has a support surface 21S which is a surface to which the light control unit 30 is attached. The support surface 21S is, for example, a surface facing inside a vehicle cabin, and supports the light control unit 30. An edge of the transparent plate 20, i.e., an outer peripheral portion of the transparent plate 20 includes a lower edge 22a, an upper edge 22b, and a side edge 22c. Each of the lower edge 22a, the upper edge 22b, and the side edge 22c is a portion including an edge of the support surface 21S, specifically, a portion including the entire thickness direction of the transparent plate 20 in a region in which the edge of the support surface 21S is located. The lower edge 22a is located inside the door member, and even when the window light control plate 10 is moved upward/downward due to opening/closing of the window, the lower edge 22a is not exposed to the outside of the door member.

The light control sheet 40 and the buffer member 50 are bonded to the support surface 21S. As viewed from a direction facing to the support surface 21S, an outer edge of the light control sheet 40 is located inside an outer edge of the transparent plate 20, and extends along an outer edge of the support surface 21S. An edge of the light control sheet 40, i.e., an outer peripheral portion of the light control sheet 40 includes a lower edge 41a, an upper edge 41b, and side edges 41c. The lower edge 41a is overlapped with the lower edge 22a of the transparent plate 20, the upper edge 41b is overlapped with the upper edge 22b of the transparent plate 20, and the side edges 41c are overlapped with the side edges 22c of the transparent plate 20. At the lower edge 41a, the light control sheet 40 includes a first electrode 42A and a second electrode 42B which are electrodes for applying a driving voltage to the light control sheet 40. The lower edge 41a of the light control sheet 40 may extend outward from the lower edge 22a of the transparent plate 20, i.e., downward from the lower edge 22a.

Each of the first electrode 42A and the second electrode 42B is connected to a driving circuit that generates a driving voltage applied to the light control sheet 40. The driving circuit and the window light control plate 10 constitute a light control device.

On the support surface 21S, the buffer member 50 is located outside the light control sheet 40. In other words, as viewed from a direction facing to the support surface 21S, the buffer member 50 is located between the outer edge of the light control sheet 40 and the outer edge of the transparent plate 20. Specifically, the buffer member 50 is located at the upper edge 22b and the side edges 22c of the transparent plate 20, and extends along the outer edge of the light control sheet 40 outside the upper edge 41b and the side edges 41c of the light control sheet 40. The buffer member 50 has an upper edge buffer portion 51 and side edge buffer portions 52. the upper edge buffer portion 51 is located at the upper edge 22b of the transparent plate 20 and extends along the upper edge 41b of the light control sheet 40. The side edge buffer portion 52 is located at the side edges 22c of the transparent plate 20 and extends along the side edges 41c of the light control sheet 40. The buffer member 50 may also be arranged outside the lower edge 41a of the light control sheet 40.

Figure 2:
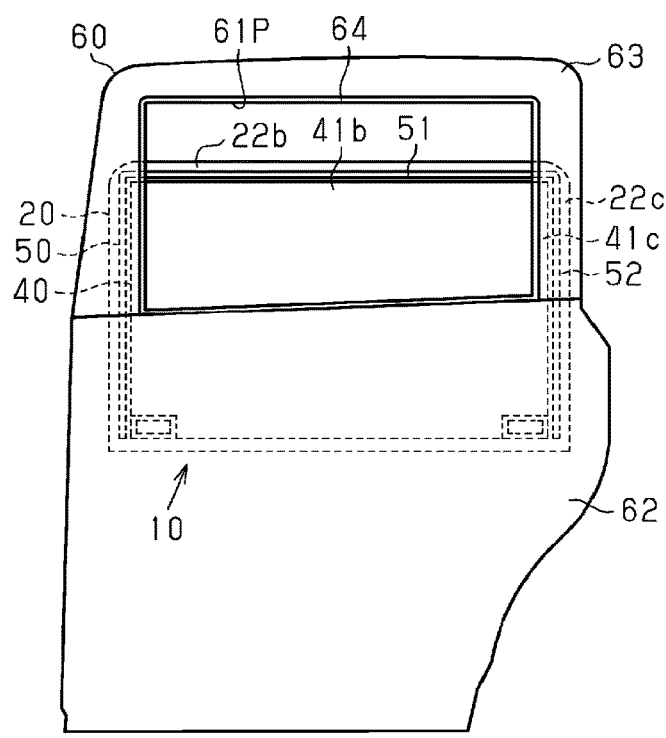
FIG. 2 shows a state in which a window including the window light control plate of the embodiment is approximately half opened.
Figure 3:
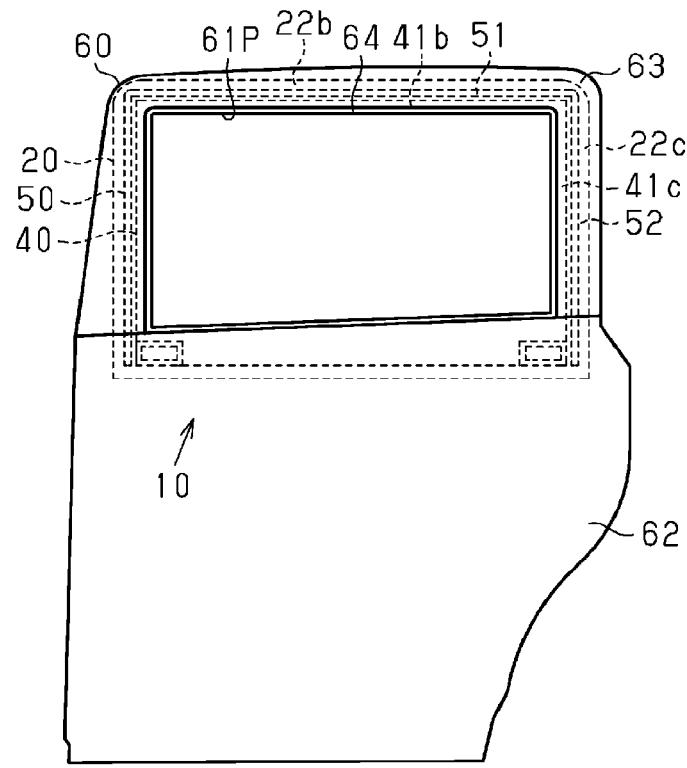
FIG. 3 shows a state in which the window including the window light control plate of the embodiment is completely closed.

FIG. 2 shows a state in which the window including the window light control plate 10 is approximately half opened, and FIG. 3 shows a state in which the window including the window light control plate 10 is completely closed.

As shown in FIGS. 2 and 3, the window light control plate 10 is assembled to a door member 60. Due to upward/downward movement of the window light control plate 10, an opening 61P defined by a window frame portion of the door member 60 is opened/closed. When the window is opened, the window light control plate 10 is moved downward, and when the window is closed, the window light control plate 10 is moved upward. In a state in which the window is completely opened, the window light control plate 10 is housed inside a door body 62 that constitutes a lower portion of the door member 60, and the opening 61P is completely opened. In a state in which the window is completely closed, the opening 61P is completely closed by the window light control plate 10.

The portion of the door member 60 that functions as a window frame is composed of an upper edge portion of the door body 62, a door frame 63, and a holding section 64. The door frame 63 extends from the upper edge portion of the door body 62 and surrounds the upper side and the lateral sides of the opening 61P. The holding section 64 is provided at an inner circumferential portion of the door frame 63. The holding section 64 is, for example, a glass run, and has a structure in which an edge of the window light control plate 10 can be held.

An upper edge of the window light control plate 10 composed of the upper edge 22b of the transparent plate 20, the upper edge buffer portion 51 of the buffer member 50, and the upper edge 41b of the light control sheet 40 is exposed from the holding section 64 during at least part of the process of opening the window. While the window is completely closed, the upper edge of the window light control plate 10 is held in the holding section 64. Thus, at an initial stage of the process of opening the window, the upper edge of the window light control plate 10 is moved out of the holding section 64 and exposed from the holding section 64. At an edge stage of the process of closing the window, the upper edge of the window light control plate 10 enters the holding section 64 and held in the holding section 64.

In a region inside the door frame 63, side edges of the window light control plate 10 composed of the side edges 22c of the transparent plate 20, the side edge buffer portions 52 of the buffer member 50, and the side edges 41c of the light control sheet 40 are held in the holding section 64 both during the process of opening/closing the window and in a state in which the window is completely closed. Thus, the side edges of the window light control plate 10 are not exposed from the holding section 64, and during the process of opening/closing the window, the side edges of the window light control plate 10 slide along the holding section 64 in a state of being held in the holding section 64.

For ease of understanding, FIGS. 1 to 3 show an example in which as viewed from a direction facing to the support surface 21S, the window light control plate 10 has a substantially rectangular shape. The shape of the window light control plate 10 is not limited to this, and the window light control plate 10 may have a shape different from a rectangular shape. For example, the upper edge of the window light control plate 10 may extend obliquely with respect to a direction orthogonal to the vertical direction, or may have a curved shape. Furthermore, for example, the side edge of the window light control plate 10 may extend obliquely with respect to the vertical direction, or may have a curved shape.

Of the edge of the window light control plate 10, the upper edge of the window light control plate 10 is a portion that is exposed from the holding section 64 during at least part of the process of opening the window, that is, a portion that is moved into/out of the holding section 64 when the window is opened/closed. Of the edge of the window light control plate 10, the side edge of the window light control plate 10 is a portion that is not exposed from the holding section 64 in the opening 61P, that is, a portion that slides within the holding section 64 when the window is opened/closed.

Figure 4:
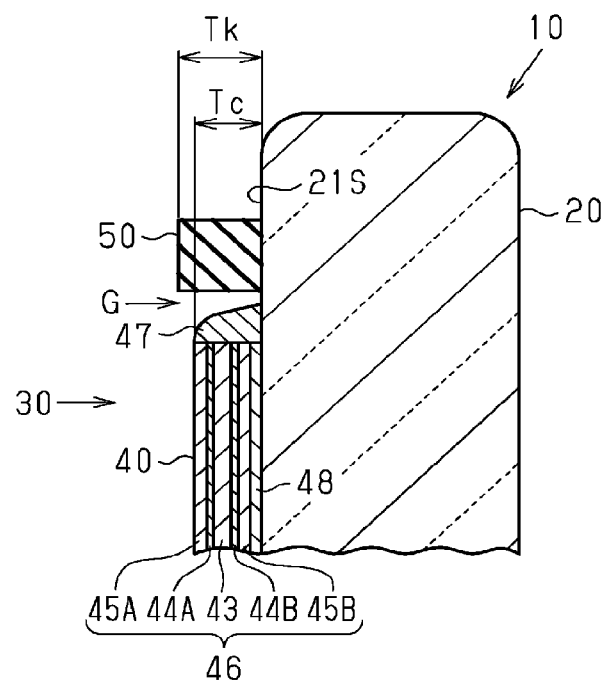
FIG. 4 shows a cross-sectional structure at an edge of the window light control plate of the embodiment.

A structure of the edge of the window light control plate 10 will be described with reference to FIG. 4.

The transparent plate 20 is a transparent plate-shaped member composed of a single layer or a plurality of layers. The material of the transparent plate 20 is not particularly limited as long as the transparent plate 20 can be used as a window plate. The transparent plate 20 may be, for example, a glass plate made of single-plate glass, double glass, laminated glass, or the like, or an acrylic plate.

The light control sheet 40 includes a light control layer 43, a transparent conductive layer 44A and a transparent conductive layer 44B which are a pair of conductive layers, and a transparent substrate 45A and a transparent substrate 45B which are a pair of substrates. The light control layer 43 is sandwiched between the transparent conductive layer 44A and the transparent conductive layer 44B, and the light control layer 43 and the transparent conductive layers 44A and 44B are sandwiched between the transparent substrate 45A and the transparent substrate 45B. The transparent conductive layer 44A is electrically connected to the first electrode 42A, and the transparent conductive layer 44B is electrically connected to the second electrode 42B. The light control layer 43, the transparent conductive layers 44A and 44B, and the transparent substrates 45A and 45B constitute a light control multilayer 46.

The light control layer 43 contains a liquid crystal composition. The light control layer 43 is composed of, for example, a polymer network liquid crystal, a polymer dispersed liquid crystal (PDLC), a nematic curvilinear aligned phase (NCAP) liquid crustal, or the like. For example, a polymer network liquid crystal has a three-dimensional mesh polymer network, and holds liquid crystal molecules in voids in the polymer network. The liquid crystal molecules contained in the light control layer 43 have, for example, positive dielectric anisotropy, and have a higher dielectric constant in a major axis direction of the liquid crystal molecules than in a minor axis direction of the liquid crystal molecules. The liquid crystal molecules are, for example, liquid crystal molecules based on a Schiff base, azo, azoxy, biphenyl, terphenyl, benzoic acid ester, tolan, pyrimidine, cyclohexanecarboxylic acid ester, phenylcyclohexane, or dioxane molecules.

Each of the transparent conductive layer 44A and the transparent conductive layer 44B is a conductive transparent layer. Examples of a material of the transparent conductive layers 44A and 44B include indium tin oxide (ITO), fluorine-doped tin oxide (FTO), tin oxide, and zinc oxide.

Each of the transparent substrate 45A and the transparent substrate 45B is a transparent substrate. The transparent substrates 45A and 45B may be, for example, a glass substrate, a silicon substrate, or a polymer film made of polyethylene, polystyrene, polyethylene terephthalate, polyvinyl alcohol, polycarbonate, polyvinyl chloride, polyimide, polysulfone, or the like.

A surface of the transparent substrate 45B on a side opposite to the light control layer 43 is bonded to the support surface 21S of the transparent plate 20 via an adhesive layer 48. The adhesive layer 48 is transparent and is composed of, for example, an adhesive made of an acrylic resin, an epoxy resin, or the like. The adhesive layer 48 is one of the components of the light control sheet 40.

The light control sheet 40 further includes a sealing section 47. The sealing section 47 is located outside the light control multilayer 46, and covers an edge surface of the light control multilayer 46 and an edge surface of the adhesive layer 48. The sealing section 47 has a function of preventing seeping of liquid and gas into the light control layer 43 from the outside, and preventing leakage of the liquid crystal composition and the like from the light control layer 43. The sealing section 47 is composed of, for example, an epoxy resin, an acrylic resin, or the like. The sealing section 47 only needs to cover at least the edge surface of the light control multilayer 46. Thus, the edge surface of the adhesive layer 48 may be exposed from the sealing section 47, or the adhesive layer 48 may extend to a position between the sealing section 47 and the transparent plate 20. Furthermore, the sealing section 47 and the adhesive layer 48 may be composed of the same material to be a single continuous member.

When no driving voltage is applied to the light control layer 43, the major axes of the liquid crystal molecules are irregularly oriented. Accordingly, light incident on the light control layer 43 is scattered and the light control sheet 40 appears whitish. Thus, when no driving voltage is applied to the light control layer 43, the light control sheet 40 is opaque. On the other hand, when a driving voltage is applied between the transparent conductive layer 44A and the transparent conductive layer 44B through the first electrode 42A and the second electrode 42B, the liquid crystal molecules are aligned, and the major axes of the liquid crystal molecules are oriented in a direction of an electric field between the transparent conductive layers 44A and 44B. As a result, light is more likely to be transmitted through the light control layer 43 and the light control sheet 40 becomes transparent.

The buffer member 50 is composed of a synthetic rubber, a thermoplastic elastomer, or the like. In terms of preventing a reduction in visibility and designability of the window, in the buffer member 50, at least the upper edge buffer portion 51 is preferably transparent. The buffer member 50 is bonded to the support surface 21S of the transparent plate 20, for example, via an adhesive layer (not shown).

In a thickness direction of the light control sheet 40, the buffer member 50 has a higher hardness than the light control sheet 40. Specifically, the buffer member 50 has a higher hardness than the light control multilayer 46 and the sealing section 47. Furthermore, the buffer member 50 preferably has a higher hardness than the holding section 64. The hardness mentioned in the present embodiment is indentation hardness exemplified by Shore hardness and durometer hardness.

The buffer member 50 has higher rigidity than the light control sheet 40. Specifically, the buffer member 50 has higher rigidity than the light control multilayer 46 and the sealing section 47.

A thickness Tk of the buffer member 50 is a maximum length from the support surface 21S to a top of the buffer member 50 in the thickness direction of the light control sheet 40. The top of the buffer member 50 is a portion of the buffer member 50 on a side opposite to a portion of the buffer member 50 attached to the support surface 21S. FIG. 4 shows an example in which the top of the buffer member 50 is flat and the entire buffer member 50 has a constant thickness.

A thickness Tc of the light control sheet 40 is a maximum thickness from the support surface 21S to an outermost surface of the light control sheet 40 in the thickness direction of the light control sheet 40. FIG. 4 shows an example in which the sealing section 47 has a thickness of not more than a thickness of a multilayer including the light control multilayer 46 and the adhesive layer 48. In this case, the thickness Tc of the light control sheet 40 is the thickness of the multilayer including the light control multilayer 46 and the adhesive layer 48. The sealing section 47 may be raised from the light control multilayer 46, and in this case, the thickness Tc of the light control sheet 40 is a maximum thickness of the sealing section 47.

The thickness Tk of the buffer member 50 is larger than the thickness Tc of the light control sheet 40. The buffer member 50 and the light control sheet 40 may be in contact with each other, but are preferably separated from each other. Thus, a gap G is preferably formed between the buffer member 50 and the sealing section 47.

The holding section 64 is composed of, for example, a synthetic rubber, a thermoplastic elastomer, a synthetic resin, or the like.

The window light control plate 10 is manufactured, for example, by the following manufacturing method. First, a multilayer sheet including the light control layer 43, the transparent conductive layers 44A and 44B, and the transparent substrates 45A and 45B is formed. Then, from the multilayer sheet, the control multilayer 46 having a shape corresponding to a shape of the transparent plate 20 is cut out or punched. Next, the light control multilayer 46 is bonded to the support surface 21S of the transparent plate 20 via the adhesive layer 48. Then, the sealing section 47 is formed to cover the edge surface of the light control multilayer 46 and the edge surface of the adhesive layer 48. In this manner, the light control sheet 40 is formed. Subsequently, the buffer member 50 is arranged outside the light control sheet 40 to form the window light control plate 10. The sealing section 47 may be formed after the buffer member 50 is arranged, or the buffer member 50 may be fixed to the support surface 21S before the light control multilayer 46.

The above manufacturing method improves efficiency in the manufacturing of the light control sheet 40 as compared with a manufacturing method in which for each light control multilayer 46, a sealing structure is formed between two transparent substrates, i.e., the transparent substrates 45A and 45B, followed by injecting a liquid crystal between the transparent substrates 45A and 45B to form the light control layer 43. Furthermore, since the light control multilayer 46 is formed by cutting out or punching from a multilayer sheet, the light control multilayer 46 having a shape corresponding to the shape of the transparent plate 20 can be easily formed.

<Action>

Figure 5:
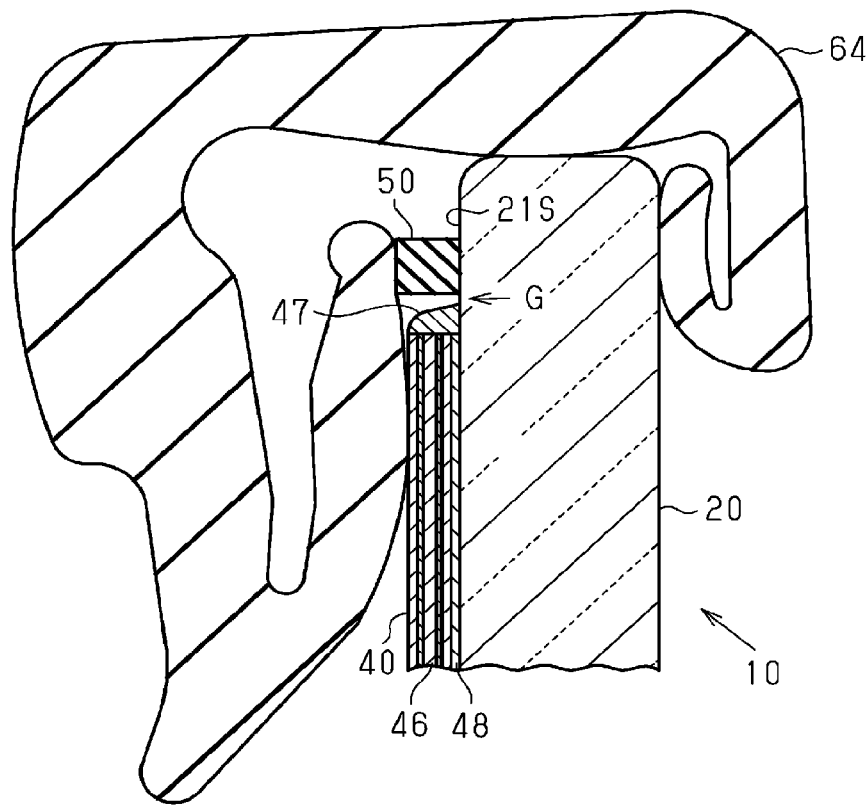
FIG. 5 shows a state in which the edge of the window light control plate of the embodiment is held in a window frame.

Action of the light control unit 30 and the window light control plate 10 will be described. FIG. 5 shows a state in which the edge of the window light control plate 10 is held in the holding section 64.

As shown in FIG. 5, since the buffer member 50 having a larger thickness than the light control sheet 40 is provided outside the light control sheet 40, the top of the buffer member 50 is in contact with the holding section 64 at an outermost portion of the light control unit 30 in the thickness direction. Furthermore, since the buffer member 50 has a higher hardness, when a compression force is applied from the holding section 64, the buffer member 50 is less likely to be compressed compared to the light control sheet 40. Thus, the compression force applied from the holding section 64 is concentrated on the buffer member 50 at the outermost portion of the light control unit 30 in the thickness direction. Accordingly, the compression force in the thickness direction applied from the holding section 64 to the edge of the light control sheet 40 is smaller than in the case where the buffer member 50 is not arranged. Thus, compression of the edge of the light control sheet 40 is prevented, and as a result, a short circuit caused by contact between the transparent conductive layer 44A and the transparent conductive layer 44B is also prevented.

In the case where the buffer member 50 is not provided, when the upper edge of the window light control plate 10 is moved into the holding section 64, the upper edge 41b of the light control sheet 40 also receives compression force from the holding section 64 in an edge surface direction which is a direction facing to an edge surface of the light control sheet 40. As a result, the upper edge 41b of the light control sheet 40 may peel off from the transparent plate 20. On the other hand, in the configuration of the light control unit 30 of the present embodiment, since the buffer member 50 is arranged outside the light control sheet 40, the compression force applied in the edge surface direction from the holding section 64 to the upper edge 41b of the light control sheet 40 is small. Thus, the upper edge 41b of the light control sheet 40 is prevented from being peeled from the transparent plate 20.

Furthermore, since the gap G is formed between the buffer member 50 and the sealing section 47, even when the buffer member 50 is pressed by the holding section 64 and deformed to extend in the edge surface direction of the light control sheet 40, the deformed buffer member 50 is prevented from pressing the edge surface of the light control sheet 40. This also makes it possible to prevent the light control sheet 40 from being deformed or peeled off from the transparent plate 20.

<Configuration Example of Buffer Member>

A preferred embodiment of a shape of the buffer member 50 will be described.

An example of the shape of the buffer member 50 at the upper edge of the window light control plate 10 will be described with reference to FIG. 6. Thus, FIG. 6 shows an example of a cross-sectional shape of the upper edge buffer portion 51.

Figure 6:
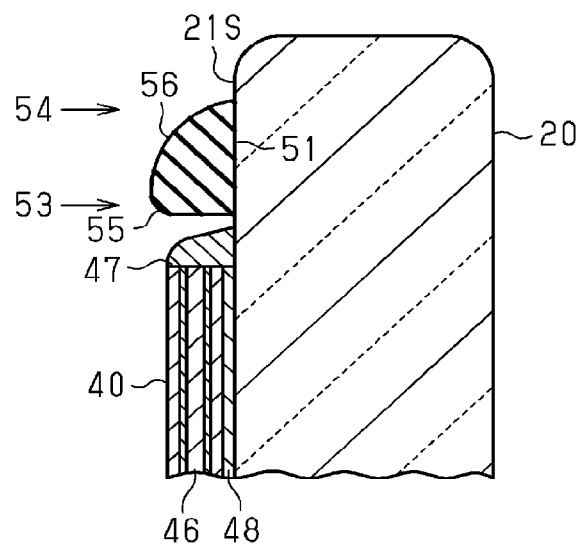
FIG. 6 shows an example of a cross-sectional structure at an upper edge of the window light control plate of the embodiment.

As shown in FIG. 6, a surface of the upper edge buffer portion 51 includes a curved surface. Of both edges in the upper edge buffer portion 51 in the edge surface direction of the light control sheet 40, i.e., in a width direction of the buffer member 50, an edge closer to the light control sheet 40 is a first edge 53, and an edge farther from the light control sheet 40 is a second edge 54. In the cross section in the width direction, the first edge 53 has a first curved portion 55 that is curved with a curvature from a top of the upper edge buffer portion 51 toward the support surface 21S.

As described above, when the window is opened, the upper edge of the window light control plate 10 moves out of the holding section 64. At this time, starting with the first edge 53, the upper edge buffer portion 51 moves from the inside of the holding section 64 to the outside of the holding section 64. In the configuration in which the first edge 53 has the first curved portion 55, when the upper edge buffer portion 51 moves to the outside of the holding section 64, the first edge 53 is less likely to be caught in the holding section 64 as compared with a configuration in which the first edge 53 has a corner portion that is bent at a right angle from the top of the upper edge buffer portion 51. Thus, the operation of opening the window of the window device is smoothly performed.

In the cross section in the width direction, the second edge 54 has a second curved portion 56 that is curved with a curvature from the top of the upper edge buffer portion 51 toward the support surface 21S.

When the window is closed, the upper edge of the window light control plate 10 enters the holding section 64. At this time, starting with the second edge 54, the upper edge buffer portion 51 moves into the inside of the holding section 64 from the outside of the holding section 64. In the configuration in which the second edge 54 has the second curved portion 56, when the upper edge buffer portion 51 moves into the inside of the holding section 64, the second edge 54 is less likely to be caught in the holding section 64 as compared with a configuration in which the second edge 54 has a corner portion that is bent at a right angle from the top of the upper edge buffer portion 51. Thus, the operation of closing the window of the window device is smoothly performed.

The second curved portion 56 preferably has a smaller curvature than the first curved portion 55. That is, the second curved portion 56 is preferably more gently curved than the first curved portion 55.

As compared with the case in which the upper edge buffer portion 51 is moved out of the holding section 64, when the upper edge buffer portion 51 is moved into the holding section 64, a larger impact is applied from the holding section 64 to the upper edge buffer portion 51, and a large force is instantaneously applied to the upper edge buffer portion 51. The more the second curved portion 56 has a smaller curvature, when the upper edge buffer portion 51 is moved into the holding section 64, the more the upper edge buffer portion 51 is gradually pressed by the holding section 64, starting with an edge of the second edge 54. Thus, the pressure applied from the holding section 64 is prevented from being concentrated on a specific portion of the upper edge buffer portion 51. Therefore, durability of the buffer member 50 is improved and the operation of closing the window is more smoothly performed.

In the configuration in which the second curved portion 56 has a smaller curvature than the first curved portion 55, the upper edge buffer portion 51 has a shape that reflects a difference in the force applied to the upper edge buffer portion 51 between when the upper edge buffer portion 51 is moved out of the holding section 64 and when the upper edge buffer portion 51 is moved into the holding section 64. Therefore, the upper edge buffer portion 51 suitable for the upper edge of the window light control plate 10 is obtained.

An example of the shape of the buffer member 50 at the side edge of the window light control plate 10 will be described with reference to FIG. 7. Thus, FIG. 7 shows an example of a cross-sectional shape of the side edge buffer portion 52.

Figure 7:
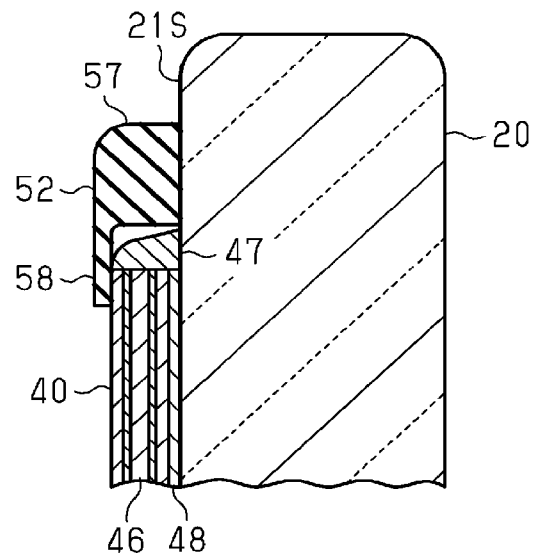
FIG. 7 shows an example of a cross-sectional structure at a side edge of the window light control plate of the embodiment.

As shown in FIG. 7, the side edge buffer portion 52 has an extending portion 58 that is overlapped with the light control sheet 40 in the thickness direction of the light control sheet 40. The extending portion 58 extends from a top of a main body 57 toward the side edges 41c of the light control sheet 40 and is in contact with the outermost surface of the light control sheet 40 on the side edges 41c. The main body 57 is a portion of the side edge buffer portions 52 located outside the light control sheet 40 on the support surface 21S. The main body 57 and the light control sheet 40 may be in contact with each other, or may be separated from each other.

In the above configuration, the side edge buffer portion 52 surrounds a space in the vicinity of the edge of the light control sheet 40. This makes it possible to prevent water or water vapor due to rainwater or the like from seeping into the vicinity of the edge surface of the light control multilayer 46.

As compared with the upper edge buffer portion 51 shown in FIG. 6, the side edge buffer portion 52 shown in FIG. 7 has a large size in the width direction, and thus tends to be conspicuous. As described above, the side edge of the window light control plate 10 is not exposed from the holding section 64. Thus, the side edge buffer portion 52 is located inside the holding section 64 and does not enter the opening 61P, and is accordingly less likely to be visually recognized. Therefore, even when the side edge buffer portion 52 shown in FIG. 7 is arranged at the side edge 22c of the transparent plate 20, the side edge buffer portion 52 is rarely visually recognized. This makes it possible to prevent a reduction in visibility and designability of the window due to the conspicuous buffer member 50.

When the buffer member 50 has a configuration in which the upper edge buffer portion 51 shown in FIG. 6 is arranged at the upper edge 22b of the transparent plate 20 and the side edge buffer portion 52 shown in FIG. 7 is arranged at the side edge 22c of the transparent plate 20, the buffer member 50 can have a configuration in which at the upper edge at which the buffer member 50 is more likely to be visually recognized, visibility and designability of the window are prioritized, and at the side edge at which the buffer member 50 is less likely to be visually recognized, protection of the light control multilayer 46 is prioritized. Thus, it is possible to achieve the buffer member 50 in which the upper edge buffer portion 51 and the side edge buffer portion 52 have functions corresponding to their respective positions.

According to the configuration in which the buffer member 50 having a harder and thicker portion than the light control sheet 40 is arranged outside the light control sheet 40, the effect of preventing compression of the edge of the light control sheet 40 is obtained regardless of the shape of the buffer member 50. For example, the upper edge buffer portion 51 may only have one of the first curved portion 55 and the second curved portion 56. Furthermore, for example, the upper edge buffer portion 51 and the side edge buffer portion 52 may have the same shape, the upper edge buffer portion 51 may have the shape of the side edge buffer portion 52 shown in FIG. 7, or the side edge buffer portion 52 may have the shape of the upper edge buffer portion 51 shown in FIG. 6. Furthermore, the buffer member 50 may have three or more portions having different cross-sectional shapes in the width direction.

As shown in FIGS. 6 and 7, in the cross section in the width direction, the thickness of the buffer member 50 in the thickness direction may not necessarily be constant, and the buffer member 50 may have a thinner portion than the light control sheet 40. In short, the thickness Tk of the buffer member 50 which is the maximum length from the support surface 21S to the top of the buffer member 50 only needs to be larger than the thickness Tc of the light control sheet 40. In other words, the buffer member 50 only needs to have a thicker portion than the light control sheet 40, and a hardness of the portion only needs to be higher than the hardness of the light control sheet 40.

As the buffer member 50 has a larger width and thickness, the buffer member 50 has higher resistance against the pressure from the holding section 64, and this improves the effect of preventing compression of the edge of the light control sheet 40. However, the larger the width and thickness the buffer member 50 has, the more conspicuous the buffer member 50 tends to be. Thus, it is preferable to use at least one of a configuration in which the side edge buffer portion 52 has a larger width than the upper edge buffer portion 51, and a configuration in which the side edge buffer portion 52 has a larger thickness than the upper edge buffer portion 51. According to such a configuration, the buffer member 50 can have a configuration in which at the upper edge at which the buffer member 50 is more likely to be visually recognized, visibility and designability of the window are prioritized, and at the side edge at which the buffer member 50 is less likely to be visually recognized, enhancement of the effect of preventing compression of the edge of the light control sheet 40 is prioritized.

The buffer member 50 may be composed of a plurality of portions separated from each other. For example, a gap may be formed between the upper edge buffer portion 51 and the side edge buffer portion 52, or the upper edge buffer portion 51 and the side edge buffer portion 52 may be composed of a plurality of portions arranged with a gap therebetween along the edge of the light control sheet 40.

Furthermore, the buffer member 50 only needs to be arranged at a part of the edge of the transparent plate 20 held in the window frame, and for example, the buffer member 50 may only have one of the upper edge buffer portion 51 and the side edge buffer portion 52. As compared with a configuration in which no buffer member 50 is arranged, in the configuration in which the buffer member 50 is arranged in at least part of the region outside the upper edge 41b and the side edges 41c of the light control sheet 40, the effect of preventing compression of the edge of the light control sheet 40 is obtained at the portion at which the buffer member 50 is arranged.

In comparison between the upper edge and the side edge of the window light control plate 10, since the upper edge is moved into/out of the holding section 64, a large compression force is more likely to be applied from the holding section 64 to the upper edge. In particular, as described above, as compared with when the upper edge is moved out of the holding section 64, when the upper edge is moved into the holding section 64, a large force is more likely to be instantaneously applied to the upper edge, and thus compression of the edge of the light control sheet 40 is more likely to occur. Therefore, in the configuration in which the upper edge of the window light control plate 10 includes the buffer member 50, the effect of preventing compression of the edge of the light control sheet 40 is high.

At the portion at which the buffer member 50 is not arranged, the edge of the light control sheet 40 may be located inside the edge of the transparent plate 20. Thus, the edge of the light control sheet 40 may not enter the holding section 64 and be exposed in the opening 61P.

As described above, according to the light control unit and the window light control plate of the present embodiment, the following effects are obtained.

(1) The buffer member 50 having a harder and thicker portion than the light control sheet 40 is located outside the edge of the light control sheet 40 at the edge of the support surface 21S of the transparent plate 20. According to this configuration, a compression force generated when the edge of the window light control plate 10 is held in the window frame acts more on the buffer member 50 than on the light control sheet 40, and the buffer member 50 is less likely to be compressed than the light control sheet 40. This makes it possible to prevent compression of the edge of the light control sheet 40 when the edge of the window light control plate 10 is held in the window frame.

(2) The light control sheet 40 includes the sealing section 47 that is located outside the light control multilayer 46 and seals the edge surface of the light control multilayer 46. Such a configuration can prevent gas and liquid from seeping into/out of the light control multilayer 46. Since the sealing section 47 which is a member for sealing the edge surface of the light control multilayer 46 is a separate member from the buffer member 50 which is a member to which a compression force from the window frame is to be applied, the members can be formed as members specialized in their respective functions, and thus the functions of the members can be improved. Furthermore, the light control sheet 40 can be formed by the method in which the light control multilayer 46 which is processed into a desired shape is bonded to the transparent plate 20, followed by forming the sealing section 47. Accordingly, efficiency in the manufacturing of the light control sheet 40 is improved as compared with a configuration in which a sealing structure is formed inside the light control multilayer 46.

(3) According to the configuration in which the gap G is formed between the sealing section 47 and the buffer member 50, even when the buffer member 50 is pressed by the window frame and deformed to extend in the width direction, the deformed buffer member 50 can be prevented from pressing the light control sheet 40.

(4) According to the configuration in which the buffer member 50 has the upper edge buffer portion 51 and the side edge buffer portion 52, in the configuration in which the upper edge and the side edge of the window light control plate 10 are held in the window frame, compression of the edge of the light control sheet 40 can be prevented at both the upper edge and the side edge.

(5) According to the configuration in which the cross-sectional shape of the upper edge buffer portion 51 in the width direction differs from the cross-sectional shape of the side edge buffer portion 52 in the width direction, the buffer member 50 can be configured to have a shape suitable for the upper edge and the side edge of the window light control plate 10, considering, for example, the presence or absence of exposure from the window frame at the upper edge and the side edge of the window light control plate 10 and differences in position to which a compression force is applied and in magnitude of the compression force between the upper edge and the side edges of the window light control plate 10.

(6) According to the configuration in which the buffer member 50 has the curved portions 55 and 56 that are curved with a curvature from the top of the buffer member 50 toward the support surface 21S, the buffer member 50 is prevented from being caught in the window frame when the edge of the window light control plate 10 is moved into/out of the window frame. Thus, the window can be smoothly opened/closed.

(7) The buffer member 50 has the main body 57 that is located outside the edge of the light control sheet 40 on the support surface 21S and the extending portion 58 that extends from the top of the main body 57 toward the edge of the light control sheet 40 and is in contact with the outermost surface of the light control sheet 40. According to such a configuration, since the buffer member 50 surrounds the vicinity of the edges of the light control sheet 40, it is possible to prevent seeping of gas and liquid, for example, seeping of water vapor or water due to rainwater or the like into the light control layer 43 or the light control sheet 40.

<Modifications>

The above embodiment can be implemented with modifications as described below.

Figure 8:
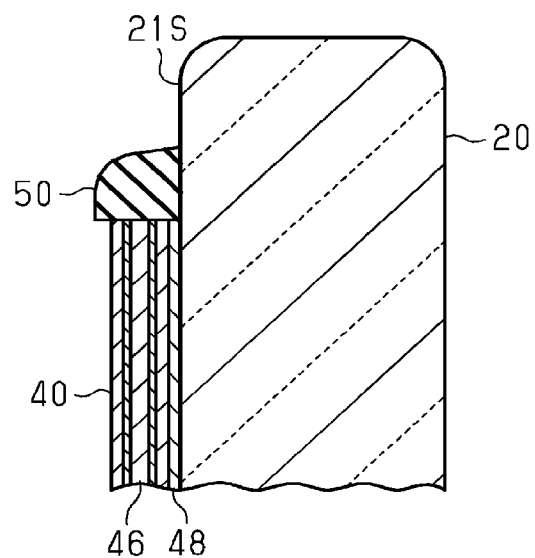
FIG. 8 shows a cross-sectional structure at an edge of a window light control plate of a modification.
Figure 9:
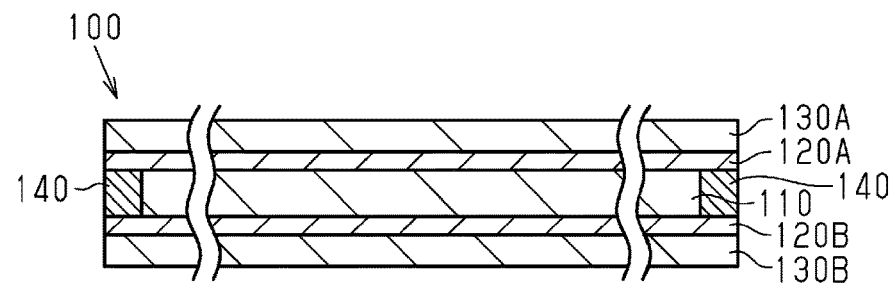
FIG. 9 shows a cross-sectional structure of a conventional light control sheet.

The light control sheet 40 may not necessarily include the sealing section 47, and the buffer member 50 may also serve as the sealing section 47. In this case, as shown in FIG. 8, the buffer member 50 is arranged to be in contact with the edge surface of the light control multilayer 46 and seals the edge surface of the light control multilayer 46. The buffer member 50 is composed of a material that can impart, to the buffer member 50, a higher hardness than the light control sheet 40 and the function of preventing gas and liquid from seeping into/out of the light control multilayer 46. According to the above configuration, the region in which the light control multilayer 46 is arranged can be extended to a position closer to the edge of the transparent plate 20 as compared with the configuration which is provided with the sealing section 47 and the buffer member 50.

A surface of the buffer member 50 may be subjected to processing for reducing friction generated between the buffer member 50 and the holding section 64 and improving lubricating properties of the buffer member 50 in the holding section 64. Such processing is embodied, for example, as application of a lubricant to the buffer member 50, or adjustment of surface roughness of the buffer member 50. If the lubricating properties of the buffer member 50 in the holding section 64 are improved, the window light control plate 10 is smoothly moved into/out of the holding section 64 and the window light control plate 10 smoothly slides along the holding section 64. This also reduces the compression force applied from the holding section 64 to the buffer member 50.

In addition to the light control layer 43, the transparent conductive layers 44A and 44B, and the transparent substrates 45A and 45B, the light control multilayer 46 may include one or more additional layers. Regardless of the layer configuration of the light control multilayer 46, the buffer member 50 has a hardness higher than the light control multilayer 46. Examples of the additional layers include a layer having a UV barrier function or the like, a layer for protecting the light control layer 43 and the transparent conductive layers 44A and 44B, a layer contributing to control optical transparency of the light control multilayer 46, and a layer improving strength or a characteristic such as heat resistance of the light control multilayer 46.

Furthermore, the light control multilayer 46 may include a pair of orientation layers that are located between the light control layer 43 and the transparent conductive layers 44A and 44B and that sandwich the light control layer 43. The orientation layer is a layer that controls orientation of the liquid crystal molecules contained in the light control layer 43. When no driving voltage is applied to the light control layer, the orientation layer causes the liquid crystal molecules to be oriented in a predetermined direction. In the configuration including the orientation layer, when no driving voltage is applied to the light control layer 43, the light control sheet 40 is transparent, and when a driving voltage is applied to the light control layer 43, the light control sheet 40 is opaque.

The light control layer 43 may include a dye that has a predetermined color and does not hinder movement of the liquid crystal molecules according to a magnitude of the voltage applied to the light control layer 43. Such a configuration achieves the light control sheet 40 having a predetermined color.

The window including the window light control plate 10 is not limited to the window of the door member of automobiles. A window only has to be one in which while the window is closed, an edge of a window plate is held in a window frame, and when the window is opened/closed, the window plate is moved while at least part of the edge of the window plate is exposed. If such a window is used in the window light control plate 10 of the above embodiment, the effect of preventing compression of the edge of the light control sheet 40 is obtained. The window provided with the window light control plate 10 is not limited to the window provided between indoors and outdoors, and may be a window that divides an indoor space into two spaces or a window that divides an outdoor space into two spaces. Furthermore, the window light control plate 10 may be moved by driving a mechanism such as a motor, or may be manually moved.

The window including the window light control plate 10 is not limited to the window of the door member of automobiles. A window only has to be one in which while the window is closed, an edge of a window plate is held in a window frame, and when the window is opened/closed, the window plate is moved while at least part of the edge of the window plate is exposed. If such a window is used in the window light control plate 10 of the above embodiment, the effect of preventing compression of the edge of the light control sheet 40 is obtained. The window provided with the window light control plate 10 is not limited to the window provided between indoors and outdoors, and may be a window that divides an indoor space into two spaces or a window that divides an outdoor space into two spaces. Furthermore, the above window may also be a window that has a structure in which a window plate is not moved relative to a window frame and that has an edge of the window plate held in the window frame. A compression force from the window frame is applied to the edge of the window plate. Accordingly, also in the case where the window light control plate 10 including the light control sheet 40 and the buffer member 50 is used in the window in which the window plate is not moved relative to the window frame, the compression force acts more on the buffer member 50 than on the light control sheet 40, and thus the effect of preventing compression of the edge of the light control sheet 40 is reasonably and sufficiently obtained. Furthermore, the movable window light control plate 10 may be moved by driving a mechanism such as a motor, or may be manually moved.

The present application addresses the following. As an example of application of the light control device, it has been proposed to apply the light control device to a movable window device mounted to automobiles. According to this proposal, the light control sheet is bonded to a window glass assembled to a door member of the automobile, and by operating the light control device, the window is switched between a light transmitting mode and a light blocking mode. In such a window, the light control sheet preferably extends to an edge of the window glass in order to prevent leakage of light from the outside of the light control sheet.

On the other hand, a window frame of the door member includes a holding section such as a glass run, and while the window is closed, the edge of the window glass is held in the holding section. When the window is opened/closed, due to upward/downward movement of the window glass, an upper edge of the window glass is moved into/out of the holding section, and a side edge of the window glass slides in the holding section. In the case where an edge of the light control sheet is located at the edge of the window glass, when the window is opened/closed, the edge of the light control sheet is moved into/out of the holding section or slides in the holding section together with the edge of the window glass. As a result, the edge of the light control sheet receives, from the holding section, a force that compresses the light control sheet in a thickness direction of the light control sheet, and a force that presses to peel off the light control sheet from an edge surface of the light control sheet.

Figure 10:
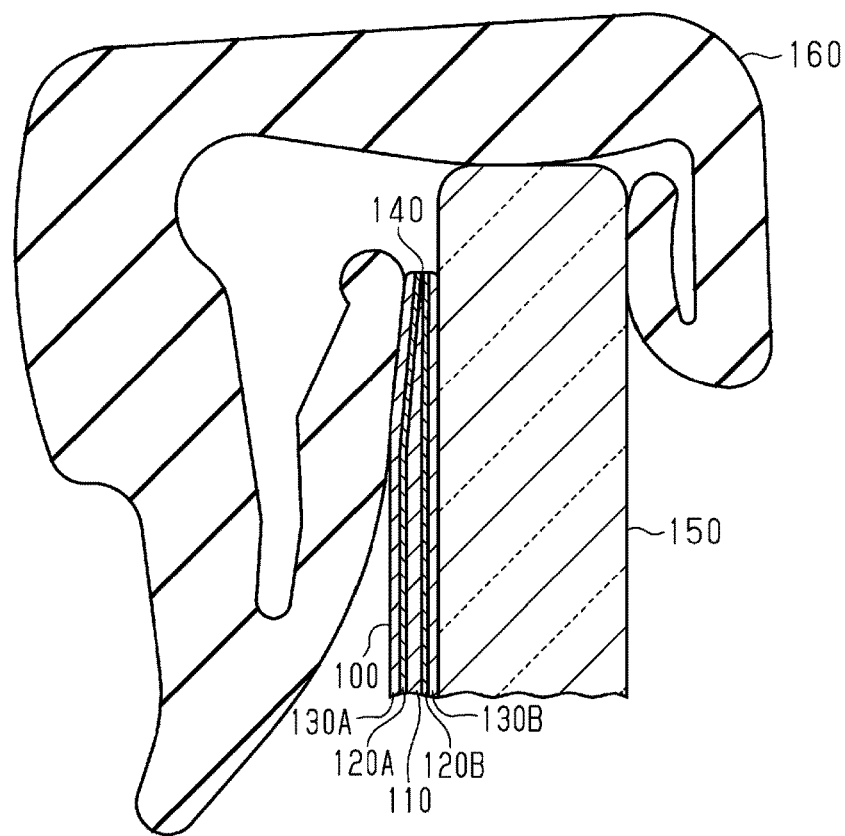
FIG. 10 shows a state in which an edge of a conventional window light control plate is held in a window frame.

FIG. 10 shows an example of a state in which an edge of a window glass 150 and an edge of the light control sheet 100 are held in a holding section 160. The light control sheet 100 is bonded to the window glass 150 via an adhesive layer (not shown). As shown in FIG. 10, when in particular a force compressing the light control sheet in the thickness direction acts on the edge of the light control sheet 100, the edge of the light control sheet 100 is deformed as if it is crushed. The compression of the edge of the light control sheet 100 may cause a short circuit due to contact between the transparent conductive layer 120A and the transparent conductive layer 120B.

An aspect of the present invention is to provide a light control unit and a window light control plate capable of preventing compression of an edge of a light control sheet.

A light control unit in an aspect of the present invention includes a light control sheet including a light control layer, and a buffer member. The light control sheet is bonded to a surface of a transparent plate having an edge that is held in a window frame. The buffer member has a portion having a higher indentation hardness and a larger thickness than the light control sheet. Also, the buffer member is located outside an edge of the light control sheet at the edge of the transparent plate on the surface. The light control unit is configured such that while the transparent plate is held in the window frame, the buffer member is in contact with the window frame.

A window light control plate in an aspect of the present invention includes a transparent plate having edges that are held in a window frame, a light control sheet, and a buffer member. The light control sheet includes a light control layer and is bonded to a surface of the transparent plate. The buffer member has a portion having a higher indentation hardness and a larger thickness than the light control sheet. Also, the buffer member is located outside an edge of the light control sheet at the edge of the transparent plate on the surface. The window light control plate is configured such that while the transparent plate is held in the window frame, the buffer member is in contact with the window frame.

According to the above configuration, a compression force generated when the edge of the light control sheet and the edge of the transparent plate are held in the window frame acts more on the buffer member than on the light control sheet, and the buffer member is less likely to be compressed than the light control sheet. This makes it possible to prevent compression of the edge of the light control sheet when the edge of the light control sheet and the edge of the transparent plate are held in the window frame.

The embodiments of the present invention can prevent compression of an edge of a light control sheet.

Obviously, numerous modifications and variations of the present invention are possible in light of the above teachings. It is therefore to be understood that within the scope of the appended claims, the invention may be practiced otherwise than as specifically described herein.

What is claimed is:

1. A light control unit, comprising:
   a light control sheet which includes a light control layer and is configured to be bonded to a surface of a transparent plate having an edge portion configured to be held in a window frame; and
   a buffer member including a portion that has a higher indentation hardness and a larger thickness than the light control sheet,
   wherein the buffer member is configured to be positioned outside an edge of the light control sheet in the edge portion of the transparent plate on the surface such that the buffer member makes contact with the window frame when the edge portion of the transparent plate is held in the window frame.

2. The light control unit according to claim 1, wherein the light control sheet includes
   a pair of transparent conductive layers sandwiching the light control layer, and
   a sealer which is positioned outside a multilayer including the light control layer and the pair of transparent conductive layers and seals an end surface of the multilayer.

3. The light control unit according to claim 2, wherein the sealer is separated by a gap from the buffer member.

4. The light control unit according to claim 1, wherein the buffer member includes an upper edge buffer portion and a side edge buffer portion, the upper edge buffer portion is configured to be positioned in an upper edge portion of the transparent plate to extend along an upper edge of the light control sheet, and the side edge buffer portion is configured to be positioned in a side edge portion of the transparent plate to extend along a side edge of the light control sheet.

5. The light control unit according to claim 4, wherein the upper edge buffer portion has a cross-sectional shape in a width direction different from a cross-sectional shape in a width direction of the side edge buffer portion.

6. The light control unit according to claim 1, wherein the buffer member has a curved portion curved with a curvature from a top of the buffer member toward the surface.

7. The light control unit according to claim 1, wherein the buffer member has a main body and an extending portion, the main body is configured to be positioned outside the edge of the light control sheet on the surface, and the extending portion extends from a top of the main body toward the edge of the light control sheet and makes contact with an outermost surface of the light control sheet.

8. A window light control plate, comprising:
   a transparent plate having an edge portion configured to be held in a window frame;
   a light control sheet bonded to a surface of the transparent plate and including a light control layer; and
   a buffer member which has a portion having a higher indentation hardness and a larger thickness than the light control sheet,
   wherein the buffer member is positioned outside an edge of the light control sheet in the edge portion of the transparent plate on the surface such that the buffer member makes contact with the window frame when the edge portion of the transparent plate is held in the window frame.

9. The window light control plate according to claim 8, wherein the light control sheet includes
   a pair of transparent conductive layers sandwiching the light control layer, and
   a sealer which is positioned outside a multilayer including the light control layer and the pair of transparent conductive layers and seals an end surface of the multilayer.

10. The window light control plate according to claim 9, wherein the sealer is separated by a gap from the buffer member.

11. The window light control plate according to claim 10, wherein the buffer member has a curved portion curved with a curvature from a top of the buffer member toward the surface of the transparent plate.

12. The window light control plate according to claim 10, wherein the buffer member has a main body and an extending portion, the main body is positioned outside the edge of the light control sheet on the surface of the transparent plate, and the extending portion extends from a top of the main body toward the edge of the light control sheet and makes contact with an outermost surface of the light control sheet.

13. The window light control plate according to claim 9, wherein the buffer member includes an upper edge buffer portion and a side edge buffer portion, the upper edge buffer portion is positioned in an upper edge portion of the transparent plate and extends along an upper edge of the light control sheet, and the side edge buffer portion is positioned in a side edge portion of the transparent plate and extends along a side edge of the light control sheet.

14. The window light control plate according to claim 13, wherein the upper edge buffer portion has a cross-sectional shape in a width direction different from a cross-sectional shape in a width direction of the side edge buffer portion.

15. The window light control plate according to claim 9, wherein the buffer member has a curved portion curved with a curvature from a top of the buffer member toward the surface of the transparent plate.

16. The window light control plate according to claim 9, wherein the buffer member has a main body and an extending portion, the main body is positioned outside the edge of the light control sheet on the surface of the transparent plate, and the extending portion extends from a top of the main body toward the edge of the light control sheet and makes contact with an outermost surface of the light control sheet.

17. The window light control plate according to claim 8, wherein the buffer member includes an upper edge buffer portion and a side edge buffer portion, the upper edge buffer portion is positioned in an upper edge portion of the transparent plate and extends along an upper edge of the light control sheet, and the side edge buffer portion is positioned in a side edge portion of the transparent plate and extends along a side edge of the light control sheet.

18. The window light control plate according to claim 17, wherein the upper edge buffer portion has a cross-sectional shape in a width direction different from a cross-sectional shape in a width direction of the side edge buffer portion.

19. The window light control plate according to claim 8, wherein the buffer member has a curved portion curved with a curvature from a top of the buffer member toward the surface of the transparent plate.

20. The window light control plate according to claim 8, wherein the buffer member has a main body and an extending portion, the main body is positioned outside the edge of the light control sheet on the surface of the transparent plate, and the extending portion extends from a top of the main body toward the edge of the light control sheet and makes contact with an outermost surface of the light control sheet.

\* \* \* \* \*